Figure 2:
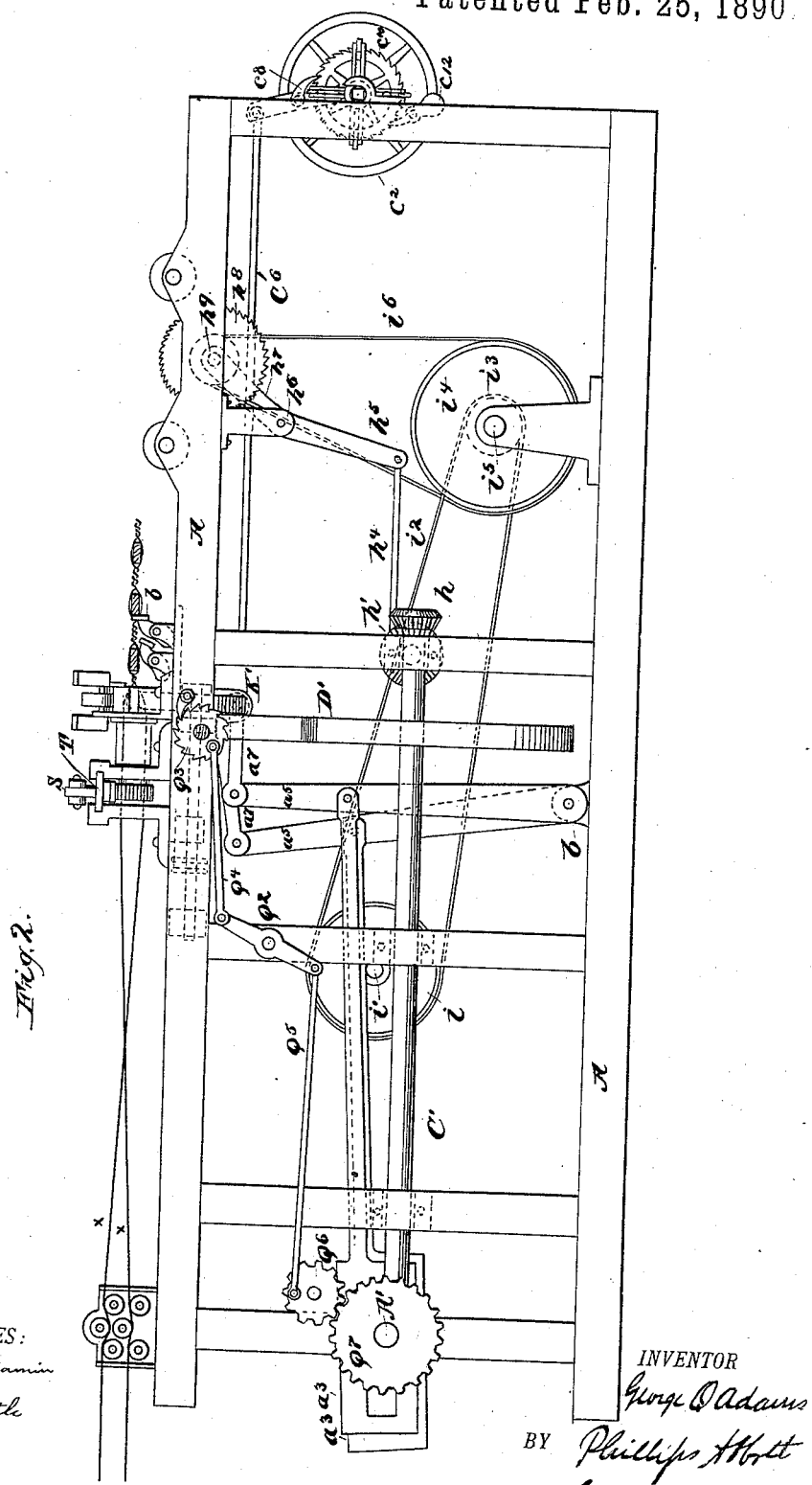

(No Model.) 6 Sheets—Sheet 1.
G. Q. ADAMS.
FENCE MAKING MACHINE.
No. 422,172. Patented Feb. 25, 1890.
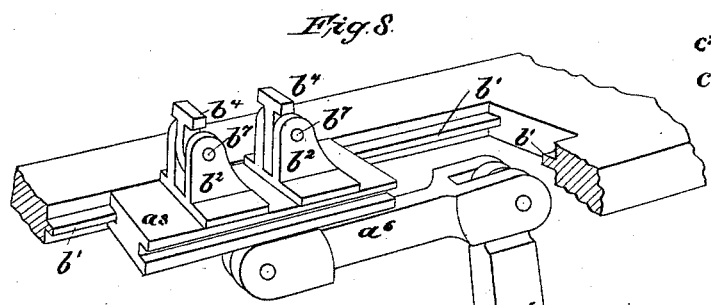
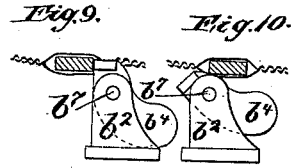
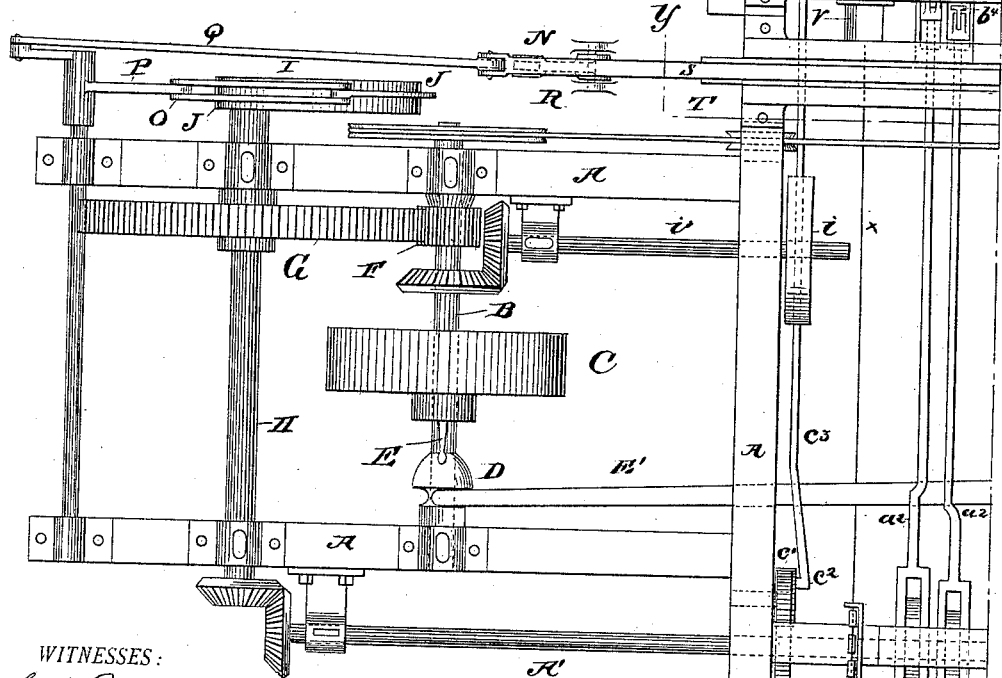
WITNESSES:
C. W. Benjamin
C. F. Smith
George Q. Adams INVENTOR
BY Phillips Abbott
his ATTORNEY

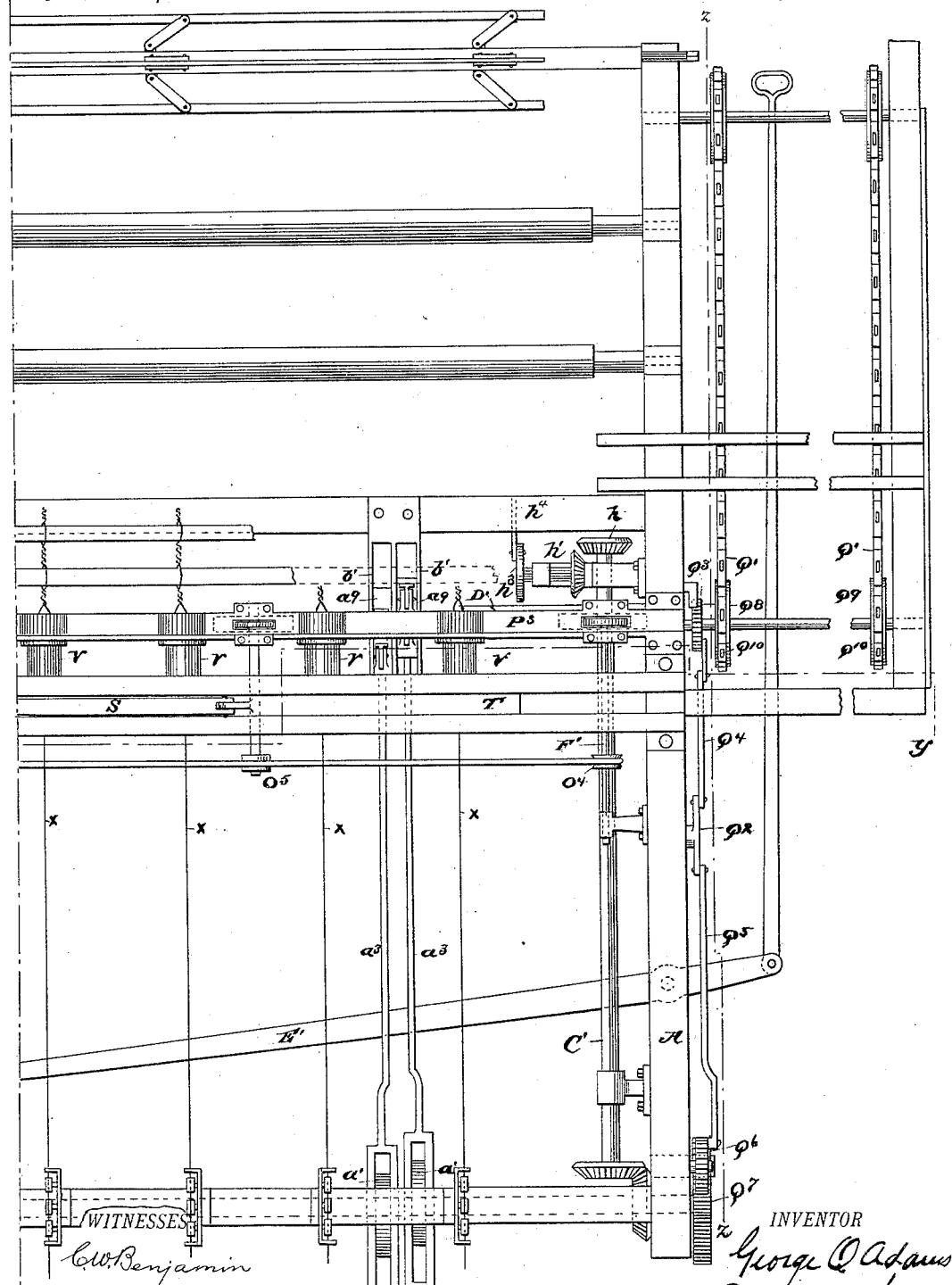

(No Model.)

G. Q. ADAMS.
FENCE MAKING MACHINE.

No. 422,172.

6 Sheets—Sheet 3.

Patented Feb. 25, 1890.

WITNESSES:
C. W. Benjamin
C. F. Smith

INVENTOR
George Q Adams
BY Phillips Abbott
his ATTORNEY

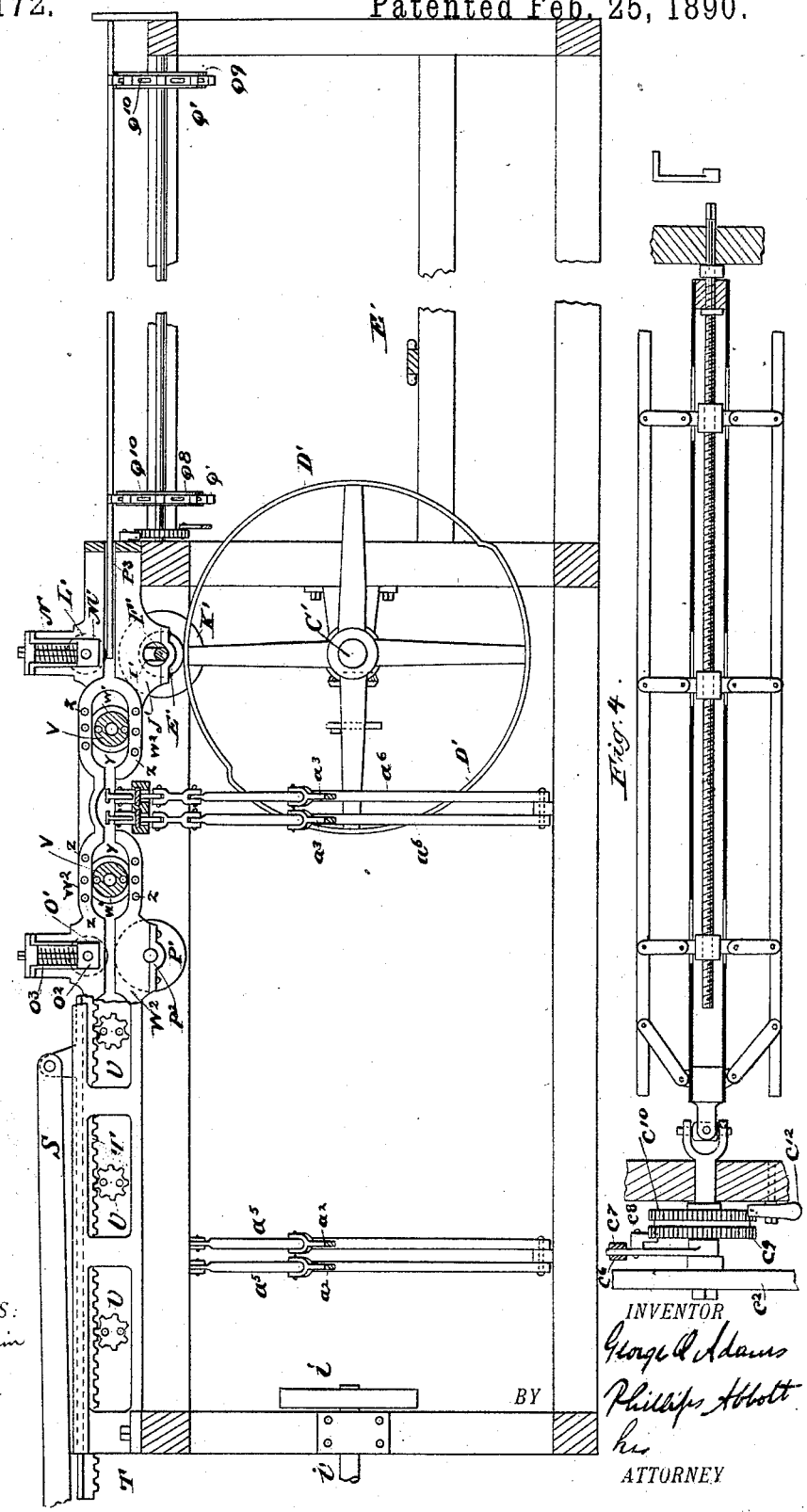

(No Model.) 6 Sheets—Sheet 5.
G. Q. ADAMS.
FENCE MAKING MACHINE.
No. 422,172. Patented Feb. 25, 1890.
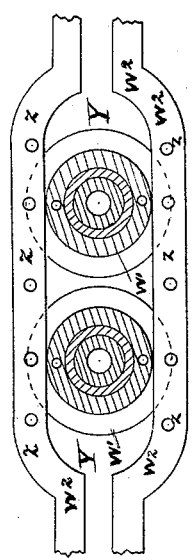
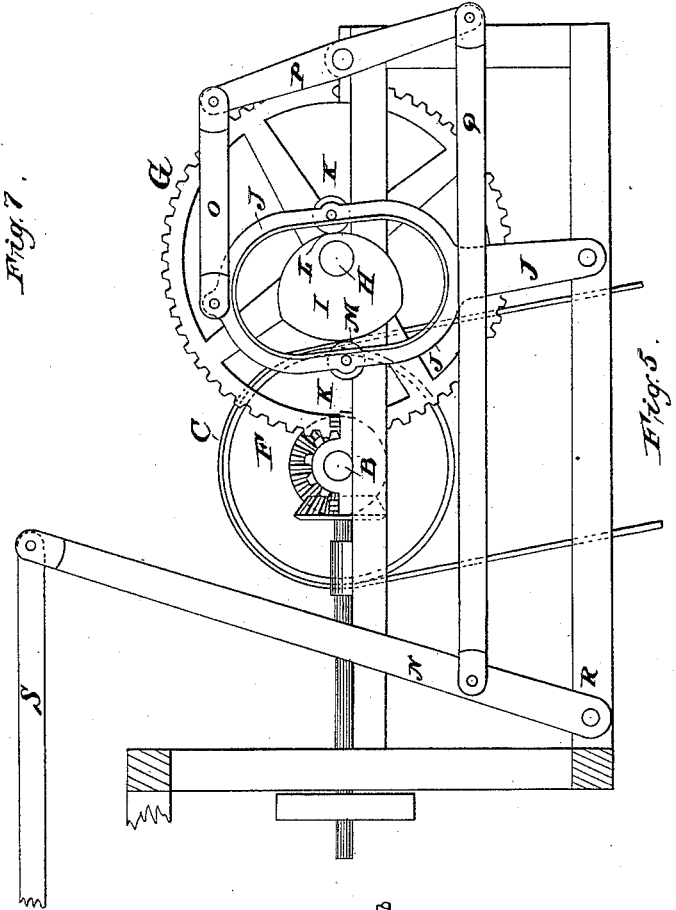
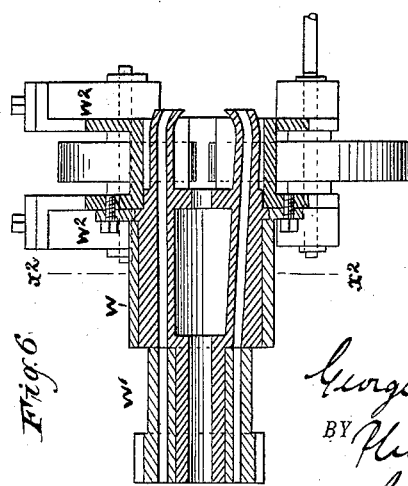
WITNESSES:
C. W. Benjamin
C. F. Smith
INVENTOR
George Q. Adams
BY Phillips Abbott
his ATTORNEY (No Model.)  6 Sheets—Sheet 6.

G. Q. ADAMS.
FENCE MAKING MACHINE.

No. 422,172.  Patented Feb. 25, 1890.

WITNESSES:
O. W. Mott
C. F. Smith

INVENTOR
George Q. Adams
BY Phillip Abbott
his ATTORNEY

UNITED STATES PATENT OFFICE.

GEORGE Q. ADAMS, OF QUINCY, ILLINOIS, ASSIGNOR TO THE ADAMS POWER FENCE MACHINE COMPANY, OF NEW YORK, N. Y.

FENCE-MAKING MACHINE.

SPECIFICATION forming part of Letters Patent No. 422,172, dated February 25, 1890.

Application filed April 16, 1889. Serial No. 307,513. (No model.)

*To all whom it may concern:*

Be it known that I, GEORGE Q. ADAMS, a citizen of the United States, and a resident of Quincy, in the county of Adams and State of Illinois, have invented certain new and useful Improvements in Fence-Making Machines, of which the following is a specification.

My invention relates to improvements in machines for making "picketed wire fences," so called; and it consists, generally stated, in novel construction of the feed mechanism, of the twister-heads, of the feed-dogs, of the reeling or take-up mechanism, and of the saw mechanism for dividing the fence as made by the machine into separate narrower fences before it passes to the reeling mechanism.

The general characteristics of the machine improved by me are a frame-supporting reel or its equivalent, containing wire, the wires from which extend forwardly in pairs and pass through "twister-heads," so called, which are given a rotary motion by the mechanism of the machine, thus twisting the two wires of each pair about each other and binding in between the wires suitably-made pickets, which are automatically and successively fed in between the wires, while the twisting mechanism is intermittently at rest, leaving the wires temporarily separated for the reception of the picket between them. The fence as made is automatically fed or pushed forward to the tail of the machine, where it is automatically wound upon a reel into bundles, and at some place between the fence-feeding devices and the winding-up reel the fence may be cut into two or more narrower strips of fencing by a suitably constructed and operated saw.

In the drawings the same reference letters and figures indicate the same parts in all the figures.

Figure 11:
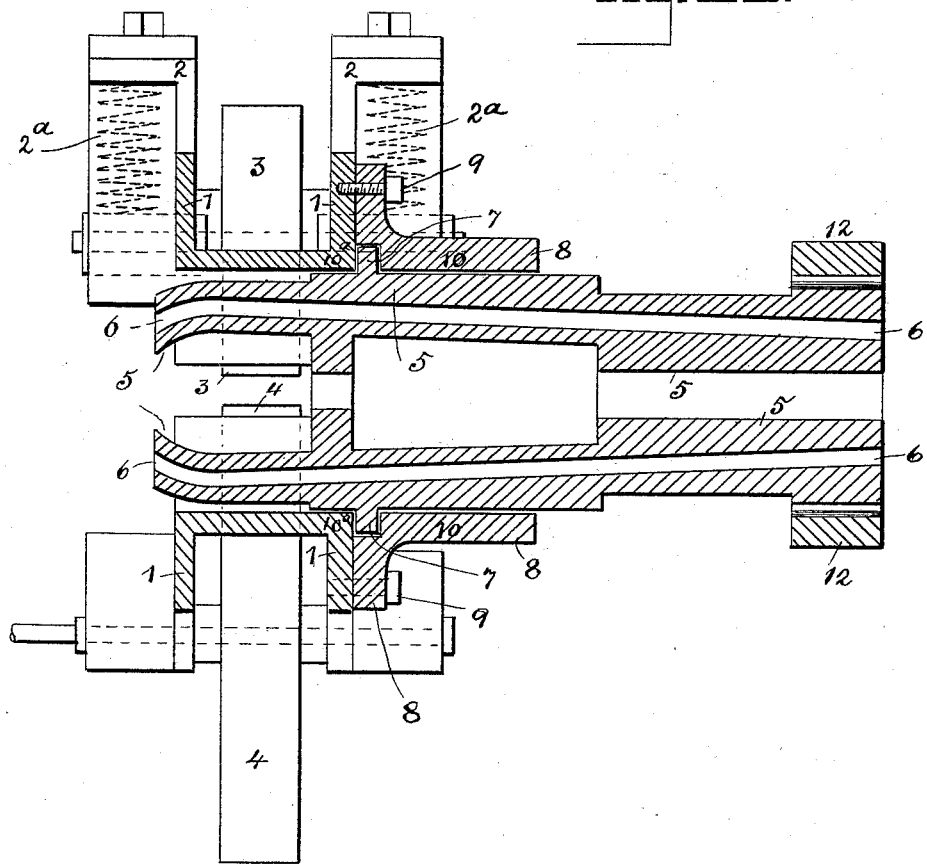

Figures 1 and 1$^a$ illustrate a plan view of the complete machine, a section being removed from the picket-feeding mechanism in order to make the drawings more compact. Fig. 2 illustrates a side elevation of the machine as shown in Fig. 1, taken on the line $z\,z$, the picket-feeding device being removed. Fig. 3 illustrates a vertical section of the machine on the line $y\,y$ of Figs. 1 and 1$^a$. Fig. 4 illustrate a longitudinal view, partly in section, of the take-up reel. Fig. 5 illustrates a side view of the cam and its coacting parts, which actuate the wire-twisting devices, the pitman being broken away. Fig. 6 illustrates a longitudinal sectional view of the wire-twisters. Fig. 7 illustrates a cross-sectional view of the machine as shown in Fig. 6 at $x^2$. Fig. 8 illustrates a perspective of the feeding-dogs. Fig. 9 illustrates one of the feed-dogs in pushing contact with a picket. Fig. 10 illustrates a feed-dog during its retractile movement passing under a picket. Fig. 11 illustrates a longitudinal vertical section of a twister-head and its bearings, &c., enlarged relative to the scale of the other parts of the drawings.

A is the frame of the machine. It may be made of such materials as preferred.

B, Figs. 1 and 5, is the main shaft, on which is set the main driving-pulley C, which is thrown in and out of gear by means of a friction-clutch D and check-block E, operated by a shipper E′, all as usual.

F is a cog-wheel, which is keyed to the main shaft and gives motion to the gear-wheel G, which is keyed to a cross-shaft H, upon one end of which is the main driving-cam I, which engages with the cam-lever J by interposed friction-rollers K K. The construction of the cam is such that during the time of contact between its surfaces L and M and the rollers K K there will be no movement of the cam-lever. This lever J is connected to a lever N by means of links and levers O P Q, pivoted to each other, as shown. The lever N is pivoted at or near the base of the machine, as at R, and at its upper end it is pivoted to a pitman S, which intermittently reciprocates a rack-bar T, (see Figs. 1 and 3,) which engages with small gears U U, &c., on the rear part of the twister-heads, thus rotating them first in one direction and then in the reverse direction, the intermittent motion being given by means of the "still" surfaces L and M on the driving-cam I.

The twisters (designated as V V, &c.) are best seen in Figs. 6 and 7. They rotate in journals W and W', which are bolted to a casting $W^2$, which is fastened in any suitable manner to the front frame of the machine.

A peculiar feature of this part of my invention consists in provision whereby the twister-heads may be adjusted, thus changing the position of the twisted strands of wire upon the pickets. I accomplish this by enlarging the openings $y\ y$ in the casting $W^2$, through which the twisters operate to adapt them to changes of position, and in providing a plurality of bolt-holes Z Z Z, &c., (best seen in Fig. 7,) whereby the journals W may be shifted along the machine either to the right or left, thus changing the position of the twisters relative to the pickets, which always occupy the same position in the machine, and also at the central opening in the casting $W^2$ (best seen in Fig. 7) I make the opening large enough to contain two twister-heads, and I provide three or more separate sets of bolt-holes Z Z, whereby the two most central twister-heads may be brought close to each other, so that the twisted wires proceeding from them and inclosing the pickets will lie at a comparatively short distance apart, preferably from about three to six inches, so that when the fence is sawed in two by the crosscut-saw, hereinafter described, the wires which lie contiguous to the cut shall be comparatively near the ends of the pickets. This is desirable.

The wires $x\ x$ come from sets of wire-holding reels, as well understood, and need not be described or shown, and pass through the holes in the twister-heads, as also well understood, and are twisted upon each other and about the pickets as they are successively fed in between the wires. The picket-feeding mechanism is as follows, reference being had specially to Figs. 1 and 3:

A' is a cross-shaft, which is driven by beveled gear from the main shaft H, (see Figs. 1 and 1$^a$,) and at the other end of this shaft there are other beveled gears B' B', by which a longitudinal shaft C' is given motion. Upon the forward end of the shaft C' there is keyed a large friction-wheel D', having two diameters, as best seen in Figs. 2 and 3.

E' is a small friction-wheel, which runs on and is rotated by frictional contact with the larger face of the wheel D' and drives the shaft F', which turns in a rocking journal G', supported on point-bearings at its rear end, (this is a well-known construction and is not shown,) thus allowing the forward end of the shaft which carries the friction-wheel E' to rise and fall, following the varying diameters of the friction driving-wheel D'. In so doing the forward end of the shaft F' passes through a slot I', made in a plate J', which sustains the shaft from lateral movement. The slot in this plate extends downwardly to such distance only as that the forward end of the shaft F' shall rest in the bottom of the slot at the time the smaller diameter of the wheel D' is adjacent to the friction-roller E'.

K' is the feed-roller. It is keyed to the shaft F' and turns with it.

L' is another feed-roller. It is set in vertically-movable journals M', directly over the roller K'. The journals M' are provided with cushioning-springs N', whereby the roller L' has slight vertical movement and is adapted to receive pickets of differing thickness and to hold them by spring-pressure. The smaller and larger diameters of the wheel D' each extend half-way around the wheel. Thus the roller E' and the feed-roller K' on its shaft are during one half-revolution of the wheel D' elevated and during the other half depressed, and the timing of the mechanism is such that they are depressed during the time the twisters are twisting the wire about a picket already fed and during the forward pushing of the completed fence, as hereinafter set forth, and are elevated during the time that the twisters are at rest and the fence-feeding dogs are making their backward movement, as also hereinafter set forth.

O' P' are two supplemental feed-rollers, which rotate in journals $O^2$ $P^2$, set in the casting $W^2$, and the picket, being guided by a suitable table $P^3$ on the said casting, passes between them and is guided and fed by them after they have left the primary feed-rollers already described.

$O^3$ are cushioning-springs for the upper supplemental feed-roller O', which permits the entrance of the picket between them and furnishes pressure for the continued feeding of the same. These spring-cushions also accommodate slight differences in thickness of the pickets and secure their constant forward feeding. The supplemental feeding-rollers are driven by a short belt from the pulley $O^4$, fast to the shaft F', which belt passes also over a like pulley $O^5$ on the axis of the lower primary feed-roller.

Q' is an endless belt or chain feeding device intermittently operated coincident with the feeding operation of the feed-rollers above described by the oscillating crank $Q^2$ and $Q^3$, which is also a ratchet-wheel, and connecting-rods $Q^4$ $Q^5$, deriving motion from a rotary crank $Q^6$, driven by gearing or in other suitable manner with a gear-wheel $Q^7$ on the end of the shaft A'. The belt, as shown, passes over suitable sprocket-wheels $Q^8$ $Q^9$, or equivalent supports, and are provided with teeth $Q^{10}$, whereby each picket is spaced as fed to the feeding-rollers. There are two sets of sprocket-wheels and feed belts or chains—one on each side of the apparatus—as shown in Figs. 1 and 3.

It is not essential that sprocket-wheels and sprocket-chains should be used, nor that the teeth $Q^{10}$ should be employed, although I prefer this construction. Other devices for feeding the pickets to the feed-rollers may be employed, or they may be inserted between them by hand.

The feed-dogs for pushing the completed fence forward toward the tail of the machine as made are as follows, special reference being had to Figs. 8, 9, and 10: The improvement in this part of my invention is that the forward push is applied, not to the newly-fed picket, which tends to displace it from its accurate spacing relative to the contiguous pickets, as heretofore, but to a picket which has already been secured in place by the twisting of the wires about it, thus securing greater efficiency in the forward pushing of the completed fence and greater accuracy in the spacing of the newly-fed picket. From four cams $a\,a$ and $a'\,a'$ on the shaft $A'$ are driven cam-levers $a^2\,a^2$ and $a^3\,a^3$, which connect with levers $a^4\,a^4$ and $a^5\,a^5$, which are pivoted at their lower ends to the base of the machine, as seen at $b$, &c., and at the upper ends of these pivoted levers links $a^6\,a^6$ and $a^7\,a^7$ (see Fig. 8) connect with sliding-way blocks $a^8\,a^8$ and $a^9\,a^9$, which slide in suitably-located ways $b'\,b'$ on the frame of the machine. On the upper surface of each of these blocks $a^8\,a^8$ and $a^9\,a^9$ are supported on suitable uprights $b^2\,b^2$ and $b^3\,b^3$ two tilting gravity-acting feeding-dogs $b^4\,b^4$ and $b^5\,b^5$. They, as seen in Figs. 9 and 10, are weighted at their rear ends $b^6$ and oscillate on axes $b^7$. They operate as follows: The cams $a$ and $a'$ have still points at their two extremities of movement, as seen by their shape, and the machine is so timed that these still points occur during the picket-feeding and the wire-twisting operations, and the adjustment is such that one set of these dogs at each side of the machine will move forwardly while the other is moving back, as shown in Figs. 9 and 10, and that the most rearward dog of those sets which are retracted will be behind the newly-fed or, in other words, incoming picket; and when they in turn move forward the newly-fed picket will be carried by the rearmost dogs of the retracted sets of dogs, as in Fig. 10, forwardly until the foremost ones bear against the picket last twisted in the fence-wires, as in Fig. 9, and the forward movement being continued the fence will be pushed along by the impact of the forward dogs against the already-confined picket, the newly-fed picket being accurately spaced, there being no pressure on it other than its own weight, and it is then in turn fastened by the twist of the wire about it. During this forward feeding of the fence by one set of dogs on each side of the machine the duplicate or corresponding sets are in turn retracted, passing under the pickets which they meet during their rearward movement by tipping on their axes as their upper ends hit the pickets, as seen in Fig. 10, and as soon as they have passed the pickets gravity causes them again to assume their proper upright position.

The reeling-up mechanism, although not next in order according to the sequence of operation of the machine, will now be described, because it is exactly coincident in time with the movements of the dogs, and is therefore allied to them.

Referring to Fig. 1, a gear-wheel $c'$ on the shaft $A'$ engages with a small gear-wheel $c'$ underneath the wheel $c$, which turns on an axis on the frame A. To this wheel $c'$ is attached by a crank-pin $c^2$ a connecting-rod $c^3$, which connects with a bell-crank lever $c^4$, from the other end $c^5$ whereof a rod $c^6$ extends to and engages with an arm $c^7$, which carries a pawl $c^8$. It engages in teeth on the periphery of a ratchet wheel or disk $c^9$, which has a flat face and is pressed as firmly as may be desired against the corresponding face of a disk $c^{10}$ by means of a hand-wheel $c^{11}$, which has a threaded hub engaging with threads on the end of the reel-shaft. The disk $c^9$ turns loosely on the shaft of the reel, excepting for its pawl, as stated; but the disk $c^{10}$ is keyed fast to the said shaft. I sometimes use a leather or other gasket-like cushion between the meeting surfaces of these disks.

$C^{12}$ is a stop-pawl pivoted to the frame of the machine, which takes up the forward movement of the reel, preventing backward turning liable from any cause. The gearing of the driving-pinion $c'$ of this part of the machine and the construction and arrangement of the parts are such that the rotation of the reel will be certainly sufficient to take up all the fence shoved forward by the dogs, as before described, and should there be any excess of winding-up action, consequent on the increase in diameter of the reel as the fence is wound upon it, such excess will be compensated for by the slipping of the surfaces of the friction-disks $c^9$ and $c^{10}$ over one another.

The reel itself is of a well-known construction, and does not require special explanation here. It is of the collapsing variety, as seen in Fig. 4, one end whereof is provided with a universal connection with the shaft and having an open journal at the other end, whereby the shaft, reel, and bundle all together may be swung outwardly from the frame of the machine, turning on the universal joint, and the reel then being collapsed, by turning the crank at the left, the bundle may be readily slipped off and the reel returned to the journals and again expanded ready for a succeeding use.

The saw attachment is best seen in Fig. 2. A bevel-gear $h$ is fastened on the end of the shaft $C'$. It meshes into another beveled gear $h'$ on a short shaft supported on the frame of the machine. To the other end of the short shaft is fixed a crank-plate $h^3$, which, acting through the instrumentality of the connecting-rod $h^4$ and pivoted lever $h^5$, which is keyed to the end of a cross-shaft $h^6$, suitably journaled on the frame of the machine, oscillates that shaft. From the medial part of the shaft $h^6$ an upwardly-extending arm $h^7$ (see Fig 2) supports the saw $h^8$, which turns on a spindle $h^9$, journaled in its upper end. A band-wheel $i$ on a cross-shaft $i'$, which is driven from any preferred moving part of the machine, acting through the belt $i^2$, speeds $i^3$ and $i^4$, which are fast on a suitably-supported shaft $i^5$, located under the saw, and the belt $i^6$, gives rotation to the saw. The timing, construction, and arrangement of all these parts are such that the saw has rotary motion all the time, but will move up against the pickets only at the time they are at rest—in other words, during the picket-feeding and the wire-twisting operations, and not during the fence forward pushing operation. Thus there is no crowding of the saw; and also I prefer that the mechanism be so constructed as that one picket only shall be severed at each upward movement of the saw. I make a series of holes in the crank-plate $h^3$, whereby I can alter the point of contact of the connecting-rod $h^4$ therewith, thereby providing for adjustment of the upward movement of the saw, as may be desired.

In order that the construction of the twister-heads may be more fully understood, I show one of them in a somewhat enlarged view as compared with the other parts of the drawings in Fig. 11. In it I give the part numeral designations, that no confusion may arise with the other parts of the drawings. 1 indicates the transverse beam, which forms part of the frame of the machine. 2 are the housings for the springs $2^a$, which bear on the journal-boxes of the feed-rollers. 3 is one of the upper feed-rollers. 4 is the coacting lower feed-roller. 5 is the twister-head proper. 6 6 are the holes or passages through it for the wires to pass through. 7 is an annular rib integral with the twister-head or firmly attached to it and which confines the same in place. 8 is an annular rectangular piece of metal which is bolted to the beam 1 by bolts 9. The part 10 thereof serves as a journal or bearing for the twister-head, either alone or in conjunction with the part marked $10^a$ of the beam. The rib prevents longitudinal movement of the twister-head, as aforesaid, by its impingement against a shoulder formed on the piece 8 and the side of the beam, as shown. 12 is the pinion on the rear end of the twister, which engages with the reciprocating rack on the machine, as already described.

The journal of the twister may, if preferred, be lined with Babbitt metal and otherwise constructed the better to adapt it to its use, and the part marked 8, instead of being a continuous ring, may be made in sections, if preferred.

The operation of my improved machine has been already pointed out during the foregoing description of the parts; but that it may be more clearly understood as a whole, I will briefly define its movements, as follows: The pickets are supplied to the endless belt-feed by hand, and are by it carried successively between the primary feed-rollers at a time when they are separated. They immediately thereafter grasp the picket between them, and during an intermission in the wire-twisting operation the picket is fed in between the separated wires by the primary feed-rollers, aided and supplemented by the supplemental feed-rollers. Then during an intermission in the picket-feeding operation the fence is shoved forward by the dogs, and the wire is then twisted about the picket last fed. During this twisting operation the saw operates, if it be used, which will only be the case when desiring to make two fences out of one wider one, and at each forward movement of the completed fence, by the pushing action of the dogs, the take-up mechanism reels up the completed fence on the reel at the tail of the machine.

I do not limit myself to the details of construction of the parts as herein shown and described. On the contrary, many alterations may be made therein and still the essentials of my invention be employed.

I claim—

1. In a fence-making machine, the combination of wire-reels, intermittently-rotated twister-heads, fence-moving devices, spring-cushioned primary feed-rollers driven by a friction-pulley having two dimensions, whereby they may be intermittently and automatically separated from each other, so that the picket may be fed between them and by them held under spring-pressure and fed into the machine, substantially as set forth.

2. In a fence-making machine, the combination of wire-reels, intermittently-rotated twister-heads, fence-moving devices, and primary feed-rollers intermittently and automatically separated from each other, and a spring-cushion which bears at one end upon the journal of one of said primary feed-rollers and at the other against an adjoining rigid part of the machine or journal-housing, whereby the picket may be fed between them and by them, held by automatically-adjusted pressure, and fed to the machine, substantially as set forth.

3. In a fence-making machine, the combination of wire-reels, intermittently-rotated twister-heads, fence-moving devices, primary feed-rollers having a spring-cushion at their axes and rotated by a driving-wheel having two dimensions which feed the pickets into the machine, and supplemental feed-rollers which receive the pickets from the primary feed-rollers and complete the feeding thereof, substantially as set forth.

4. In a fence-making machine, the combination of wire-reels, intermittently-rotated twister-heads, fence-moving devices, primary and secondary feed-rollers which feed the pickets to the machine, and a spring-cushion for each set of feed-rollers bearing upon the journals thereof at one end and at the other end against some rigid part of the machine or journal-housing, whereby they hold the pickets by automatically-adjusted spring-pressure, substantially as set forth.

5. In a fence-making machine, wire-twister heads, automatic and intermittent fence-feeding mechanism, and a saw placed and arranged to cut the fence lengthwise and automatically brought into contact with the pickets during intermissions in the feeding of the fence, substantially as set forth.

6. In a fence-making machine, wire-twister heads, automatic and intermittent fence feeding and reeling mechanism, and a saw placed and arranged to cut the fence lengthwise and automatically brought into contact with the picket during intermissions in the feeding of the fence, substantially as set forth.

7. In a fence-making machine, a saw set between the twister-heads and the reeling mechanism and placed and arranged to cut the fence lengthwise, and automatically and intermittently moved against and away from the fence-pickets, substantially as set forth.

8. A reel for a fence-making machine, comprising, essentially, a revoluble shaft having a frame for the support of the fence, the bearing whereof at one end is constructed and arranged so that the shaft can be removed therefrom at pleasure, a hinge-joint in the shaft between the other bearing and the said frame, two friction-surfaces placed upon the shaft, and means to press them together, one of them being fast on the shaft and the other loose thereon, means to drive the loose one, and a stop to prevent backward turning of the reel, substantially as set forth.

9. In a fence-making machine, the combination of picket-conveying devices adapted to convey the pickets one after the other to picket-feeding rollers, and cushioned picket-feeding rollers set in line with the said picket-conveying devices, which receive the pickets direct from the conveying devices, substantially as set forth.

10. In a fence-making machine, intermittently-acting fence-feeding mechanism comprising duplicate sets of feeding-dogs, the dogs of each set being arranged in pairs, one behind the other, and all of them adapted to be tilted on their axes, and one whereof of each pair feeds the fence by impact against the picket last fastened by the twisting of the wires about it, and the other whereof adjusts the picket last fed between the wires, and means, substantially as described, whereby one set of dogs will be advanced while the other set are being retracted, substantially as set forth.

11. In a fence-making machine, intermittently-acting fence-feeding mechanism comprising, essentially, longitudinally-moving plates or supports having feeding-dogs pivoted thereto arranged in pairs, one behind the other, both of which are arranged to tip upon their axes, whereby a picket may be fed behind them when in their forward position and the rearmost ones of each pair be allowed to get behind the picket when retracted, substantially as set forth.

Signed at New York, in the county of New York and State of New York, this 23d day of March, A. D. 1889.

GEORGE Q. ADAMS.

Witnesses:
PHILLIPS ABBOTT,
FREDERICK SMITH.